(12) United States Patent
Bamberg et al.

(10) Patent No.: US 10,875,258 B2
(45) Date of Patent: Dec. 29, 2020

(54) MULTI-FREQUENCY INDUCTION HEATING OF GENERATIVELY PRODUCED COMPONENTS

(75) Inventors: Joachim Bamberg, Dachau (DE); Erwin Bayer, Dachau (DE); Andreas Jakimov, Munich (DE); Herbert Hanrieder, Hohenkammer (DE); Bertram Kopperger, Dachau (DE); Wilhelm Satzger, Munich (DE); Thomas Hess, Munich (DE); Karl-Heinz Dusel, Unterschleissheim (DE); Stefan Schneiderbanger, Bergkirchen (DE)

(73) Assignee: MTU AERO ENGINES AG, Munich (DE)

( * ) Notice: Subject to any disclaimer, the term of this patent is extended or adjusted under 35 U.S.C. 154(b) by 1430 days.

(21) Appl. No.: 14/346,782

(22) PCT Filed: Sep. 12, 2012

(86) PCT No.: PCT/EP2012/003827
§ 371 (c)(1),
(2), (4) Date: May 19, 2014

(87) PCT Pub. No.: WO2013/041195
PCT Pub. Date: Mar. 28, 2013

(65) Prior Publication Data
US 2014/0239553 A1 Aug. 28, 2014

(30) Foreign Application Priority Data
Sep. 22, 2011 (EP) ...................................... 11182335

(51) Int. Cl.
*B29C 67/00* (2017.01)
*B22F 3/105* (2006.01)
*B29C 64/153* (2017.01)

(52) U.S. Cl.
CPC ........ *B29C 67/0077* (2013.01); *B22F 3/1055* (2013.01); *B29C 64/153* (2017.08);
(Continued)

(58) Field of Classification Search
CPC .................................................. B29C 67/0077
See application file for complete search history.

(56) References Cited

U.S. PATENT DOCUMENTS 5,088,047 A 2/1992 Bynum
5,155,321 A * 10/1992 Grube .................. B22F 3/1055
219/121.85
(Continued)

FOREIGN PATENT DOCUMENTS

DE 102004022385 A1 11/2005
DE 202009012628 U1 12/2009
(Continued)

*Primary Examiner* — Jacob T Minskey
(74) *Attorney, Agent, or Firm* — Abel Schillinger, LLP

(57) ABSTRACT

The invention relates to a method and device for generatively producing components, said device comprising a radiation device for selectively radiating a powder bed, and an induction device for inductively heating the component produced by radiating the powder bed, Said induction device comprising at least one voltage source which can simultaneously produce alternating voltages with at least two different frequencies.

15 Claims, 1 Drawing Sheet

(52) U.S. Cl.
CPC .............. *B22F 2003/1053* (2013.01); *B22F 2003/1056* (2013.01); *B22F 2999/00* (2013.01); *Y02P 10/25* (2015.11)

(56) References Cited

U.S. PATENT DOCUMENTS

| | | | | |
|---|---|---|---|---|
| 5,352,405 | A * | 10/1994 | Beaman | B22F 3/1055 219/121.6 |
| 5,805,971 | A | 9/1998 | Akedo | |
| 6,376,148 | B1 * | 4/2002 | Liu | B22F 3/008 156/273.1 |
| 6,617,546 | B2 * | 9/2003 | Manetsberger | B22F 3/1055 219/121.85 |
| 7,087,870 | B1 * | 8/2006 | Fishman | H02M 7/523 219/661 |
| 7,557,708 | B1 * | 7/2009 | Pacholok | G06K 7/0008 219/600 |
| 8,460,629 | B2 * | 6/2013 | Fishman | H05B 3/26 423/348 |
| 8,584,357 | B2 | 11/2013 | Richter et al. | |
| 8,610,027 | B2 | 12/2013 | Hoevel et al. | |
| 8,658,951 | B2 * | 2/2014 | Yonenaga | H01L 21/67109 219/634 |
| 9,326,329 | B2 * | 4/2016 | Kitaizumi | H05B 6/065 |
| 2002/0158054 | A1 * | 10/2002 | Manetsberger | B22F 3/1055 219/121.85 |
| 2007/0241482 | A1 * | 10/2007 | Giller | B29C 67/0066 264/494 |
| 2010/0151145 | A1 | 6/2010 | Richter et al. | |
| 2011/0248024 | A1 * | 10/2011 | Yonenaga | H01L 21/67109 219/634 |
| 2012/0018115 | A1 | 1/2012 | Hoevel et al. | |
| 2012/0213659 | A1 | 8/2012 | Bayer et al. | |
| 2012/0261405 | A1 * | 10/2012 | Kurose | H05B 6/44 219/620 |
| 2012/0329659 | A1 * | 12/2012 | Holcomb | B22F 3/00 505/400 |
| 2013/0032973 | A1 * | 2/2013 | Lucas | H05B 6/106 264/406 |
| 2013/0284083 | A1 * | 10/2013 | Okada | C30B 29/36 117/28 |
| 2014/0363327 | A1 * | 12/2014 | Holcomb | B22F 3/1017 419/53 |
| 2015/0165545 | A1 * | 6/2015 | Goehler | B22F 3/1055 219/121.15 |
| 2015/0246481 | A1 * | 9/2015 | Schlick | B29C 35/00 264/461 |

FOREIGN PATENT DOCUMENTS

| | | |
|---|---|---|
| DE | 102009051479 A1 | 5/2011 |
| EP | 2359964 B1 | 8/2011 |
| WO | 2008071165 A1 | 6/2008 |

* cited by examiner

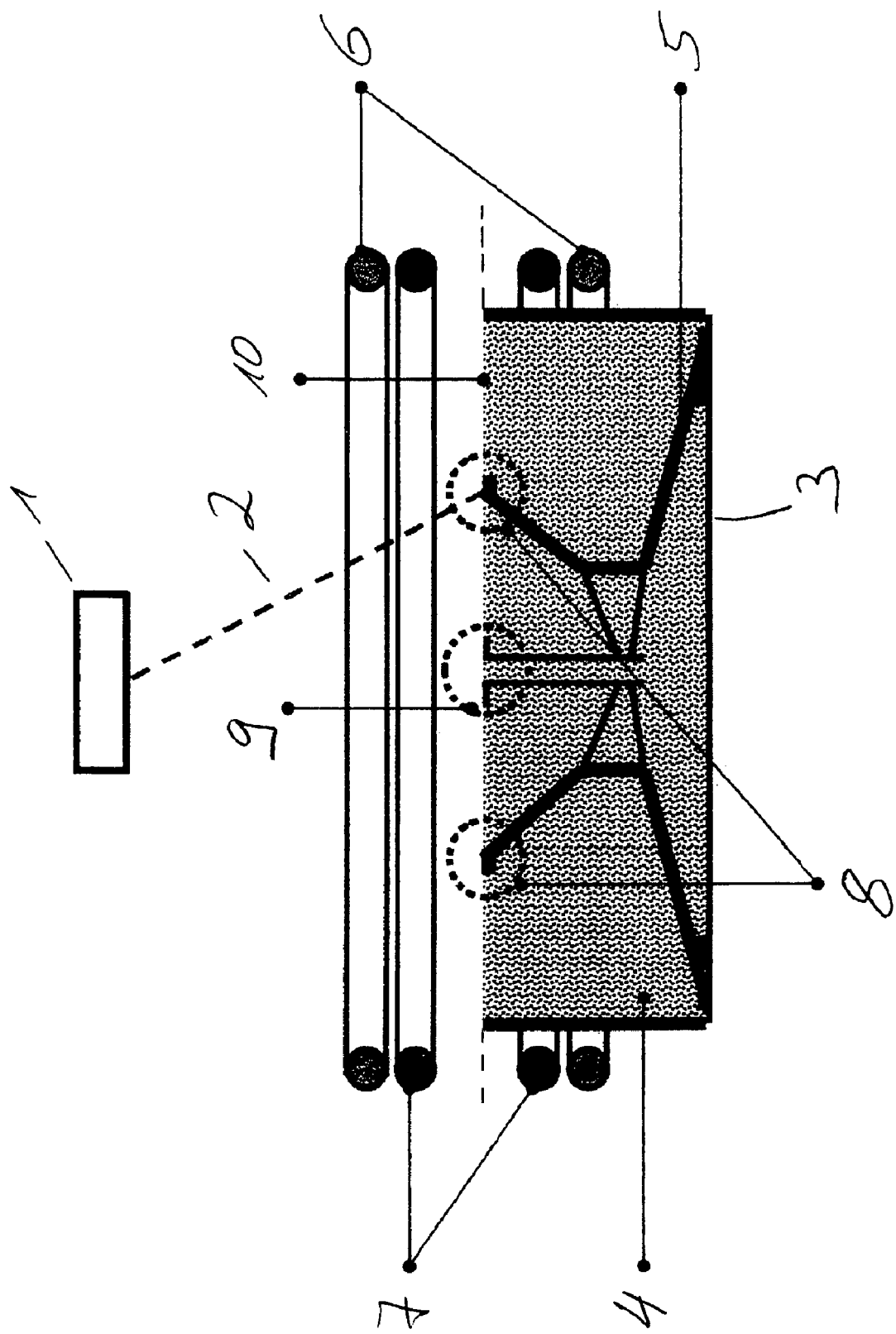

MULTI-FREQUENCY INDUCTION HEATING OF GENERATIVELY PRODUCED COMPONENTS

BACKGROUND OF THE INVENTION

Field of the Invention

The present invention relates to a method and a device for producing components by a generative production process, in particular a method by means of selectively radiating a powder bed.

DISCUSSION OF BACKGROUND INFORMATION

Generative production processes for the rapid production of prototypes or for the production of components that are difficult to produce by other processes are known from the prior art. Among the processes used for this are selective laser melting (SLM) or direct metal laser sintering (DMLS). Generative production processes for the production of components of a turbomachine, such as for example components of an aircraft engine or a gas turbine, are also known in particular from the prior art, for example the method described in DE 10 2009 051 479 A1 and a corresponding device for producing a component of a turbomachine.

In the case of this method, layer-by-layer deposition of at least one powdered component material on a component platform in the region of a building-up and joining zone and also layer-by-layer, local melting or sintering of the component material by means of energy supplied in the region of the building-up and joining zone are used to produce a corresponding component. The energy is supplied here by way of laser beams, such as for example $CO_2$ lasers, Nd:YAG lasers, Yb fiber lasers and diode lasers, or by electron beams. In the case of the method described in DE 10 2009 051 479 A1, the component created or the building-up and joining zone is also heated to a temperature just below the melting point of the component material by means of a zone furnace, in order to maintain a directionally solidified or monocrystalline crystal structure.

DE 10 2004 022 385 A1 likewise discloses a device and a method for rapidly producing micro bodies in which, in addition to the selective melting or sintering of particles by means of laser beams, a magnetic field is provided in the region of the building-up and joining zone for the compaction of the particles of the deposited layers. Moreover, radiant heating, which acts on the surface of the particles, is provided, for example in the form of powerful halogen lighting, and heating of the component carrier.

WO 2008/071165 A1 in turn describes a device and a method for the repair of turbine blades of gas turbines by means of powder deposition welding, a radiation source, such as a laser or an electron beam, being used for the deposition welding. At the same time, a heating device for heating the blade to be repaired is also provided in the form of an induction coil.

Although it is consequently known from the prior art that, in the case of a generative production process in which powder particles are melted or sintered by means of radiation to form a component, heating of the component is additionally provided, and that this additional heating is realized by means of inductive heating, there are still problems in using such generative production processes for high-temperature alloys that are not meltable or weldable, since unacceptable heat cracks often occur in such alloys.

DISCLOSURE OF THE INVENTION

The problem addressed by the present invention is therefore that of providing a method and a device for the generative production of components for materials that are susceptible to heat cracks, while at the same time it is intended that the freedoms of geometrical design of the generative production process should be restricted as little as possible. It is also intended that the method can be easily carried out and that a corresponding device can be easily produced and can be easily operated.

The problem described above is solved by a method and by a device with the features which are recited in the independent claims. Advantageous embodiments are recited in the dependent claims.

The present invention is based on the idea that, by the use of at least two alternating voltages that have different frequencies, a selective inductive heating of regions of the component produced is possible, so that sufficiently high temperatures can be achieved in the corresponding regions of the component and at the same time a restrictive effect of the inductive heating on the generative production process is avoided. Alternating voltage is understood here as meaning any form of a suitable alternating induction voltage, such as a square-wave voltage, zigzag voltage, an asymmetric alternating voltage or the like.

The generative production process may be realized by direct metal laser sintering or selective laser melting. Quite generally, any high-energy beams, such as laser beams or electron beams, may be used for the selective melting and or sintering of powder particles in a powder bed in order to produce a corresponding component. All that matters is that the component produced is at the same time inductively heated, at least two alternating induction voltages with different frequencies being used in order to be able to selectively set specific areas of effect, in order in this way to achieve sufficient heating of the component produced, in particular in the plane in which the next layer is built up, so that crack-inducing temperature gradients or stresses that are brought about by uneven cooling can be avoided.

For the induction heating, an induction device that has at least one coil may be provided, it being possible for two or more alternating induction voltages with different frequencies to be superposed on the coil.

In addition, it is also possible to provide multiple coils, it being possible both for individual alternating voltages, which are in turn different from one another, to be respectively applied individually to the coils and for a number of coils to be operated each with a number of alternating voltages with different frequencies. In particular, any desired combination of individual coils with a number of superposed alternating induction voltages of different frequencies with coils to which only one alternating voltage is respectively applied are possible.

In addition, in the case of the method and/or the device, the arrangement of single or multiple coils may be chosen such that there is no impairment of the generative production process, that is to say no impairment of the freedom of design in the production of the component.

The at least one coil of the induction device may be arranged above and/or around the powder bed, since a selective localization of the areas of effect is possible by selectively choosing the corresponding excitation frequencies, and in this way, undesired melting or sintering of the powder particles in the powder bed can be avoided. In particular, the single or multiple coils may be only partly arranged above and/or around the powder bed, so that corresponding turns of the coils are arranged both above and below a building plane in which the next layer is applied to the component to be produced.

In the case of multiple coils, they may be arranged along the coil axis, that is to say the axial axis around which the turns run, or the coils may be arranged one inside the other, so that turns of one coil are therefore arranged within the turns of another coil, to be precise both axially and radially.

The coils may be at least partly arranged above the powder bed in such a way that the corresponding high-energy radiation is at least partly directed through the coil onto the powder bed.

In the case of the present invention, both a method and a device that is suitable for carrying out the method are proposed. Correspondingly, the device may comprise all of the components that are necessary for carrying out the method described. Conversely, the method may have all of the method steps that are possible by the described components of the device.

BRIEF DESCRIPTION OF THE DRAWING

The appended FIGURE shows purely schematically, in a lateral sectional view, a device according to the invention for producing components by means of a generative production process.

DETAILED DESCRIPTION OF THE INVENTION

The present invention is explained in detail on the basis of the exemplary embodiment described more specifically below, it being clear to a person skilled in the art that the invention is not restricted to this exemplary embodiment.

The FIGURE shows a laser 1, with which a laser beam 2 that can be moved over a surface area can be generated. Instead of a laser beam 2, other types of radiation, such as for example electron beams or other high-energy beams, may be used.

The laser beam 2 can be moved in particular over a surface area that is defined by the building plane 10 and the powder container 3. The powder container 3 contains a powder bed 4 comprising a multiplicity of powder particles of one or more materials, from which the component 5 to be created is to be produced. When the laser beam 2 impinges on the powder in the building plane 10, the powder particles are melted or are heated so intensely that they are fused with neighboring powder particles, and the component 5 already created, by sintering. In this way, the component 5 can be produced layer by layer from the powder of the powder bed 4. All that is required for this purpose is to arrange new layers of powder over the component 5 already created and to melt or sinter them layer by layer to form a solid body. For this, the component 5 may be lowered step by step with the bottom of the powder container 3, so that a new layer of powder can be deposited on the upper side of the powder bed.

In order to avoid damage to the already produced component 5 being caused by strong temperature differences, for example by stress cracks or heat cracks, the component 5 is inductively heated, in particular in the areas of effect 8, 9 that are encircled by dashed lines. Provided for this purpose are two coils 6, 7, which are represented in section as part-rings. The coils 6, 7 are connected to high-frequency generators, which can generate high-frequency alternating voltages with frequencies in the range of several kilohertz to several megahertz. The alternating voltage applied to the coils, or the alternating currents generated as a result, have the effect that eddy currents are induced in the component 5, leading to heating of the component.

Suitable arrangement of the coils 6, 7, in particular above and/or below the building plane 10, and the choice of suitable frequencies for the applied alternating voltage allow the areas of effect 8 and 9 to be specifically set, so that effective heating of the component 5 in the critical regions of the component can be set without undesired melting or sintering processes occurring in the powder bed 4. In particular by the use of a number of different frequencies for the induction voltages in the coils 6, 7, selective local heating of the component 5 can be achieved without excessive heating occurring in other regions, in which heating is not desired. This also makes possible the arrangement of the coils 6, 7 around the powder container 3 or around the powder bed 4, without there being the risk of the entire building space being heated up excessively and the powder contained therein sintering or melting. At the same time, it is ensured that the freedom of design in the powder container 3 is not impaired by a corresponding arrangement of the coils 6, 7. In particular, the areas of effect 8, 9 can be produced in the region of the building plane 10, so that temperature gradients on the component surfaces within the building plane 10 are avoided or reduced.

Instead of the coils 6 and 7 shown, which are each operated with different frequencies of the alternating induction voltage, just a single coil or multiple coils may also be provided, in the case of a single coil it likewise being possible for alternating voltages with different frequencies to be superposed, while in the case of multiple coils a combination of coils with different alternating induction voltages and/or the superposing of alternating induction voltages on individual coils or all of the coils is possible. According to the required areas of effect 8, 9, which also depend on the geometry of the component 5 to be produced, a different number of coils with different frequencies of alternating induction voltages may be used, and the arrangement of the coils chosen.

In the case of the exemplary embodiment shown, the coil 6 is arranged in such a way that its turns are arranged above and below the coil 7, so that the coils 6 and 7 are placed one inside the other. However, it is also conceivable that, if multiple coils are used, the coils are arranged one behind the other, that is to say for example along the axis of the coils, which is perpendicular to the building plane 10. Other arrangements of the coils are also conceivable.

Although the present invention has been described in detail on the basis of the exemplary embodiment, the invention is not restricted to this exemplary embodiment, but rather modifications are possible in such a way that individual features may be omitted or other combinations of features may be realized, without departing from the protective scope of the claims. In particular, the disclosure of the present invention comprises all combinations of the individual features presented.

What is claimed is:

1. A method for producing a component, wherein the method comprises selectively radiating a powder bed for producing the component while at the same time inductively heating the component, an excitation of induction being brought about by an alternating voltage that comprises at least two simultaneously applied different frequencies, wherein two or more coils are employed and (i) individual alternating voltages that are different from each other are applied to some or all of the two or more coils or (ii) several alternating voltages with different frequencies are applied to an individual coil in the case of some or all of the two or more coils.

2. The method of claim 1, wherein several alternating voltages with different frequencies are applied to an individual coil in the case of some or all of the two or more coils.

3. The method of claim 1, wherein individual alternating voltages that are different from each other are applied to some or all of the two or more coils.

4. A method for producing a component, wherein the method comprises selectively radiating a powder bed for producing the component while at the same time inductively heating the component, an excitation of induction being brought about by an alternating voltage that comprises at least two simultaneously applied different frequencies, wherein at least one of an arrangement of coils for inductive heating and a choice of frequencies of alternating voltages is such that areas of effect of the inductive heating lie in a region of the component that is being generated and wherein (i) at least one coil is employed for inductive heating and is arranged in such a way that it is at least partly arranged above a plane in which the component is generated in the powder bed by radiation and/or (ii) at least two coils are employed for inductive heating and are arranged in such a way that they are arranged one inside the other and/or one after the other along an axis of the coils.

5. The method of claim 4, wherein at least two coils are employed for inductive heating and are arranged in such a way that they are arranged one inside the other and/or one after the other along an axis of the coils.

6. The method of claim 4, wherein at least one coil is employed for inductive heating and is arranged in such a way that it is at least partly arranged above a plane in which the component is generated in the powder bed by radiation.

7. The method of claim 4, wherein at least two coils are employed for inductive heating and are arranged in such a way that they are arranged one inside the other and/or one after the other along an axis of the coils.

8. A method for producing a component, wherein the method comprises selectively radiating a powder bed for producing the component while at the same time inductively heating the component, an excitation of induction being brought about by an alternating voltage that comprises at least two simultaneously applied different frequencies, wherein (i) at least one coil is employed for inductive heating and is arranged in such a way that it is at least partly arranged above a plane in which the component is generated in the powder bed by radiation or (ii) at least two coils are employed for inductive heating and are arranged in such a way that they are arranged one inside the other and/or one after the other along an axis of the coils.

9. The method of claim 8, wherein at least one coil is employed for inductive heating and is arranged in such a way that it is at least partly arranged above a plane in which the component is generated in the powder bed by radiation.

10. The method of claim 8, wherein at least two coils are employed for inductive heating and are arranged in such a way that they are arranged one inside the other and/or one after the other along an axis of the coils.

11. A method for producing a component, wherein the method comprises selectively radiating a powder bed for producing the component while at the same time inductively heating the component, an excitation of induction being brought about by an alternating voltage that comprises at least two simultaneously applied different frequencies, wherein the powder bed is radiated by laser radiation or electron radiation and the radiation is directed onto the powder bed through a coil for inductive heating.

12. A device for producing a component by means of selectively radiating a powder bed, wherein the device comprises (i) a radiating arrangement for selectively radiating a powder bed and (ii) an induction device for inductively heating the component generated by radiating the powder bed, the induction device comprising at least one voltage source that is capable of generating at the same time alternating voltages with at least two different frequencies and is capable of inductively heating the component, wherein the induction device comprises (i) at least one coil that is at least partly arranged above a plane in which the component is generated in the powder bed by radiation and/or (ii) at least two coils for inductive heating which are arranged in such a way that they are arranged one inside the other and/or one after the other along an axis of the coils.

13. The device of claim 12, wherein the induction device comprises at least one coil for inductive heating that is arranged in such a way that it is at least partly arranged around the component being generated.

14. The device of claim 12, wherein the induction device comprises at least two coils for inductive heating which are arranged in such a way that they are arranged one inside the other and/or one after the other along an axis of the coils.

15. The device of claim 12, wherein the induction device comprises at least one coil that is at least partly arranged above a plane in which the component is generated in the powder bed by radiation.

* * * * *